US008451325B2

(12) United States Patent  (10) Patent No.: US 8,451,325 B2
Birnbaum et al.  (45) Date of Patent: May 28, 2013

(54) VIDEO CUSTOMIZATION AND PRESENTATION SYSTEMS AND METHODS

(75) Inventors: Daniel A. Birnbaum, Los Angeles, CA (US); Jason T. Meltzer, Los Angeles, CA (US)

(73) Assignee: Sightcine Inc., Los Angeles, CA (US)

( * ) Notice: Subject to any disclaimer, the term of this patent is extended or adjusted under 35 U.S.C. 154(b) by 621 days.

(21) Appl. No.: 12/692,635

(22) Filed: Jan. 24, 2010

(65) Prior Publication Data

US 2010/0188488 A1  Jul. 29, 2010

Related U.S. Application Data

(60) Provisional application No. 61/147,114, filed on Jan. 25, 2009.

(51) Int. Cl.
 *H04N 9/31* (2006.01)
(52) U.S. Cl.
 USPC ................................. 348/53; 348/55; 348/598
(58) Field of Classification Search
 CPC ........................... H04N 5/44513; H04N 13/007
 USPC ............................................. 348/53, 598, 55
 See application file for complete search history.

(56) References Cited

U.S. PATENT DOCUMENTS

| 5,629,984 | A | | 5/1997 | McManis |
| 5,821,989 | A | | 10/1998 | Lazzaro et al. |
| 6,057,811 | A | * | 5/2000 | Edwards ............................ 345/8 |
| 6,188,422 | B1 | | 2/2001 | Ogura |
| 6,529,209 | B1 | | 3/2003 | Dunn et al. |
| 6,741,323 | B2 | | 5/2004 | Plunkett |
| 7,430,018 | B1 | | 9/2008 | Patel |
| 7,932,993 | B2 | * | 4/2011 | Mei ................................. 355/53 |
| 2007/0216868 | A1 | | 9/2007 | Cashin |
| 2008/0291122 | A1 | * | 11/2008 | Smith et al. ...................... 345/55 |
| 2010/0079676 | A1 | * | 4/2010 | Kritt et al. ...................... 348/598 |

* cited by examiner

*Primary Examiner* — Tung Vo
*Assistant Examiner* — Obafemi Sosanya
(74) *Attorney, Agent, or Firm* — Krueger Iselin LLP

(57) ABSTRACT

A disclosed projection system includes a display that renders a video representing a sequence of original images each having a corresponding frame interval, and one or more viewing device(s). During each frame interval, multiple subimages are displayed that, in some cases, average together to approximate an original image corresponding to that frame interval. The viewing device(s) attenuate each of the subimages by a respective coefficient to synthesize a target image for each frame interval. The system may include additional viewing device(s) that apply attenuation coefficients to the subimages to synthesize a second, different target image for each frame interval. A described projection method includes displaying multiple subimages in each frame interval, and transmitting attenuation coefficients to the viewing device(s). A disclosed movie customization system includes software that causes processor(s) to process each of multiple original video images to determine the corresponding subimages and weight coefficients.

23 Claims, 8 Drawing Sheets

ORIGINAL IMAGE

TARGET IMAGE 1

TARGET IMAGE 2

|  |  |  |  | ORIGINAL IMAGE |
|---|---|---|---|---|
| .90 | .90 | .90 | .90 | |
| .70 | .70 | .70 | .70 | |
| .50 | .50 | .50 | .50 | |
| .35 | .35 | .35 | .35 | |

|  |  |  |  | TARGET IMAGE 1 |
|---|---|---|---|---|
| .50 | .10 | .50 | .50 | |
| .50 | .10 | .50 | .50 | |
| .50 | .10 | .50 | .50 | |
| .50 | .10 | .10 | .50 | |

|  |  |  |  | TARGET IMAGE 2 |
|---|---|---|---|---|
| .10 | .50 | .50 | .50 | |
| .50 | .10 | .50 | .50 | |
| .50 | .50 | .10 | .50 | |
| .50 | .50 | .50 | .10 | |

SUB-IMAGE 0

| .59 | .80 | .76 | 0 |
|---|---|---|---|
| 0 | 1.0 | 0 | 0 |
| 0 | 0 | 0 | 0 |
| 0 | 0 | 0 | 0 |

$W_{00}=1.0$  $W_{10}=.07$  $W_{20}=.01$

SUB-IMAGE 1

| .22 | 0 | .94 | .94 |
|---|---|---|---|
| 1.0 | 0 | 1.0 | 1.0 |
| 1.0 | .26 | .43 | 1.0 |
| .84 | .26 | .26 | .49 |

$W_{01}=1.0$  $W_{11}=.47$  $W_{21}=.43$

SUB-IMAGE 2

| 1.0 | 0 | 0 | .51 |
|---|---|---|---|
| .21 | .23 | .21 | .21 |
| 0 | 0 | .62 | 0 |
| 0 | 0 | 0 | .27 |

$W_{02}=1.0$  $W_{12}=.35$  $W_{22}=0$

SUB-IMAGE 3

| 0 | 1.0 | .10 | .35 |
|---|---|---|---|
| .20 | .14 | .20 | .20 |
| .04 | .78 | 0 | .04 |
| 0 | .51 | .51 | 0 |

$W_{03}=1.0$  $W_{13}=0$  $W_{23}=.54$

|  |  |  |  | OVERALL IMAGE |
|---|---|---|---|---|
| .90 | .90 | .90 | .90 | |
| .70 | .69 | .70 | .70 | |
| .51 | .50 | .52 | .51 | |
| .41 | .38 | .38 | .38 | |

|  |  |  |  | VIEWR 1 IMAGE |
|---|---|---|---|---|
| .50 | .10 | .50 | .50 | |
| .50 | .13 | .50 | .50 | |
| .47 | .10 | .40 | .47 | |
| .39 | .08 | .08 | .31 | |

|  |  |  |  | VIEWR 2 IMAGE |
|---|---|---|---|---|
| .10 | .50 | .50 | .50 | |
| .50 | .12 | .50 | .50 | |
| .45 | .50 | .13 | .45 | |
| .35 | .39 | .39 | .15 | |

| | | | | TARGET IMAGE 0 |
|---|---|---|---|---|
| .65 | .65 | .87 | .85 | |
| 1.0 | .95 | .74 | .58 | |
| .54 | .74 | .86 | .83 | |
| .96 | .62 | .73 | .55 | |

| | | | | TARGET IMAGE 1 |
|---|---|---|---|---|
| 1.0 | .20 | 1.0 | 1.0 | |
| 1.0 | .20 | 1.0 | 1.0 | |
| 1.0 | .20 | 1.0 | 1.0 | |
| 1.0 | .20 | .20 | 1.0 | |

| | | | | TARGET IMAGE 2 |
|---|---|---|---|---|
| .20 | 1.0 | 1.0 | 1.0 | |
| 1.0 | .20 | 1.0 | 1.0 | |
| 1.0 | 1.0 | .20 | 1.0 | |
| 1.0 | 1.0 | 1.0 | .20 | |

SUB-IMAGE 0:
| .08 | .16 | .36 | .30 |
| .52 | 1.0 | .15 | 0 |
| 0 | .28 | .36 | .32 |
| .06 | .11 | .26 | 0 |

$W_{00}=.91$   $W_{10}=.05$   $W_{20}=.19$

SUB-IMAGE 1:
| 1.0 | 0 | .33 | .38 |
| .35 | .16 | .40 | .32 |
| .27 | 0 | .99 | .32 |
| .83 | .01 | 0 | .95 |

$W_{01}=.56$   $W_{11}=1.0$   $W_{21}=.14$

SUB-IMAGE 2:
| .05 | .97 | .02 | .10 |
| .02 | 0 | .15 | .03 |
| 0 | .95 | 0 | 0 |
| .88 | 1.0 | .95 | 0 |

$W_{02}=.52$   $W_{12}=.18$   $W_{22}=.99$

SUB-IMAGE 3:
| 0 | .02 | .91 | .83 |
| .87 | 0 | .80 | .96 |
| 1.0 | .02 | 0 | .93 |
| .02 | 0 | .02 | .07 |

$W_{03}=.37$   $W_{13}=.66$   $W_{23}=.89$

| | | | | VIEWR 0 IMAGE |
|---|---|---|---|---|
| .66 | .66 | .86 | .84 | |
| 1.0 | 1.0 | .73 | .55 | |
| .52 | .75 | .88 | .82 | |
| .97 | .62 | .74 | .55 | |

| | | | | VIEWR 1 IMAGE |
|---|---|---|---|---|
| 1.0 | .20 | .96 | .96 | |
| .96 | .20 | .96 | .96 | |
| .93 | .20 | 1.0 | .96 | |
| 1.0 | .20 | .20 | 1.0 | |

| | | | | VIEWR 2 IMAGE |
|---|---|---|---|---|
| .20 | 1.0 | .94 | .94 | |
| .94 | .21 | .94 | .93 | |
| .93 | 1.0 | .21 | .94 | |
| 1.0 | 1.0 | 1.0 | .19 | |

Fig. 8

ORIGINAL IMAGE

| 1.0 | 0.8 | 0.4 | 0.0 |
|---|---|---|---|
| 1.0 | 0.8 | 0.4 | 0.0 |
| 1.0 | 0.8 | 0.4 | 0.0 |
| 1.0 | 0.8 | 0.4 | 0.0 |

SUB-IMAGE 0

| 0.0 | 0.0 | 0.0 | 0.0 |
|---|---|---|---|
| 1.0 | 0.3 | 0.0 | 0.0 |
| 0.5 | 0.3 | 0.0 | 0.0 |
| 0.0 | 0.7 | 1.0 | 0.0 |

MASK 0

| 0.0 | 0.0 | 0.0 | 1.0 |
|---|---|---|---|
| 1.0 | 0.4 | 0.0 | 1.0 |
| 0.5 | 0.4 | 0.0 | 1.0 |
| 0.0 | 0.9 | 1.0 | 1.0 |

SUB-IMAGE 1

| 0.0 | 0.0 | 0.0 | 0.0 |
|---|---|---|---|
| 0.0 | 1.0 | 0.7 | 0.0 |
| 0.5 | 0.3 | 0.0 | 0.0 |
| 1.0 | 0.0 | 0.0 | 0.0 |

MASK 1

| 0.0 | 0.0 | 0.0 | 1.0 |
|---|---|---|---|
| 0.0 | 1.0 | 1.0 | 1.0 |
| 0.5 | 0.4 | 0.0 | 1.0 |
| 1.0 | 0.0 | 0.0 | 1.0 |

SUB-IMAGE 2

| 1.0 | 0.8 | 0.4 | 0.0 |
|---|---|---|---|
| 1.0 | 0.1 | 0.0 | 0.0 |
| 1.0 | 1.0 | 0.0 | 0.0 |
| 1.0 | 0.5 | 0.0 | 0.0 |

MASK 2

| 1.0 | 1.0 | 1.0 | 1.0 |
|---|---|---|---|
| 1.0 | 0.1 | 0.0 | 1.0 |
| 1.0 | 1.0 | 0.0 | 1.0 |
| 1.0 | 0.6 | 0.0 | 1.0 |

SUB-IMAGE 3

| 1.0 | 0.8 | 0.4 | 0.0 |
|---|---|---|---|
| 0.0 | 0.2 | 0.1 | 0.4 |
| 0.0 | 0.0 | 0.9 | 0.4 |
| 0.0 | 0.4 | 0.0 | 0.4 |

MASK 3

| 1.0 | 1.0 | 1.0 | 1.0 |
|---|---|---|---|
| 0.0 | 0.3 | 0.3 | 1.0 |
| 0.0 | 0.0 | 1.0 | 1.0 |
| 0.0 | 0.5 | 0.0 | 1.0 |

VIDEO CUSTOMIZATION AND PRESENTATION SYSTEMS AND METHODS

CROSS-REFERENCE TO RELATED APPLICATIONS

The present application claims priority to Provisional U.S. Patent Application 61/147,114, entitled "A display system for individually customized viewing of still and moving pictures in a multi-viewer environment" and filed Jan. 25, 2009, by inventors Daniel Birnbaum and Jason Meltzer, incorporated herein by reference in its entirety.

BACKGROUND

The human visual system experiences "flicker fusion" when images are presented in rapid succession. When a viewer sees a series of images in sequence at a high enough frequency, the images combine to create an illusion of motion and continuity. For example, a movie is a sequence of images, called frames, that are projected on a screen with sufficient rapidity to create the illusion of motion and continuity. The frames of movies are typically displayed to viewers at a rate of 24 frames per second. Other frame rates can also be used, e.g., many television systems present 30 frames per second, where each frame is divided into two fields of interlaced lines, giving a display rate of 60 fields per second.

Subtitles are textual versions of sound and dialog in movies, films, and television programs. Subtitles are often displayed at the bottom of a screen for the hearing impaired or for viewers who understand a foreign language, enabling them to enjoy a show that they otherwise could not understand. Subtitles must be large enough to be readable, and typically obscure a portion of the video content. Subtitles may thus be objectionable to viewers that can hear and understand the dialog.

International travel is becoming easier and more affordable. At the same time, the number of public venues, such as theme parks, attracting international audiences is increasing. Video presentations are commonly used at public venues to educate and to entertain. A problem arises when people (e.g., from different countries) wish to view, for example, a movie at the same time. A typical movie includes a video portion and an audio portion, where the audio portion includes a dialog in a certain language. At least some of the people will likely wish to view the presentation with subtitles, while others would object to the subtitles. Moreover, speakers of different languages would wish to view different subtitles, but there is a practical limit to how many subtitles may be added to a video without detracting substantially from the video presentation.

There are also other contexts in which different viewers wish to view different video content at the same time on a given display. For example, simultaneous multiplayer video games require all players to interact with the game at the same time (i.e. first-person shooters or racing games). When played on a single console and display, the display must be fragmented into sectors, each of which shows a different player's view. This both reduces the resolution of the display per viewer and allows opposing players to spy on one another's private viewpoint.

The authors are unaware of any prior art systems or methods that can adequately address these difficulties.

SUMMARY

The problems highlighted above are addressed, at least in part, by disclosed video customization and presentation systems and methods. In at least some of the system embodiments, a projection system includes a display and one or more viewing device(s). The display renders a video represented by a set of original images sequentially presented during corresponding frame intervals. The rendering is performed by displaying multiple subimages in each frame interval. The viewing device(s) attenuate each of the subimages by a respective coefficient to synthesize a target image for each frame interval for a user of the viewing device. The weight coefficients range between 0 and 1, inclusive, and different sets of weight coefficients enable additional viewing devices to synthesize additional target images. In some applications, the subimages for a given frame interval average together to approximate an original image for that frame interval, enabling viewers without viewing devices to see unmodified video content. The projection system may further include a wireless communication system that communicates attenuation coefficients for each target image in each frame interval. The attenuation coefficients may vary from one frame interval to the next. A viewer not using a viewing device may see the original image, which is equivalent to having weight coefficients all equal to 1. This condition is dependent on the target application.

Also disclosed is an information storage medium such as a DVD, hard disk, or integrated memory device, that stores for each frame interval, the multiple subimages and the respective coefficients to produce multiple target images. Alternatively, the information storage medium may store, for each frame interval, a corresponding original image with multiple overlay masks to convert the original image into the subimages, and the respective coefficients to produce multiple target images from the subimages.

A disclosed projection method includes displaying in each of multiple frame intervals multiple subimages that, in some cases, average to substantially equal a frame from a video. At the same time, the method includes transmitting, to a viewing device, attenuation coefficients in a range between 0 and 1, inclusive. When applied to the subimages, the attenuation coefficients enable a user of the viewing device to perceive a customized image for each frame interval. The projection method may also include transmitting, to a second viewing device, attenuation coefficients that, when applied to the subimages, enable a user of the second viewing device to perceive a second, different customized image for each frame interval. The viewing devices may be, for example, LCD shutter glasses having a duty cycle that varies in accordance with the attenuation coefficients. The subimage attenuation coefficients may vary between frame intervals.

A disclosed movie customization system includes one or more processor(s) and a memory coupled to the processor(s) and storing software. The software causes the processor(s) to process each of multiple original video images to determine a corresponding set of subimages and weight coefficients. The subimages may average to approximate the original video image. The subimages further combine together to form any one of multiple desired video images when attenuated in accordance with a corresponding set of weight coefficients. The subimages may be optimized to maximize transparency of viewing devices subject to accuracy constraints regarding the original video image and the desired video images. The software may implement, for example, a non-negative matrix factorization process for each frame interval to determine the corresponding set of subimages and weight coefficients.

BRIEF DESCRIPTION OF THE DRAWINGS

A better understanding of the various disclosed embodiments can be obtained when the following detailed description is considered in conjunction with the drawings, in which:

FIG. 8 is a diagram illustrating an original image and four overlay masks that can be used to form four subimages from the original image.

Figure 1:
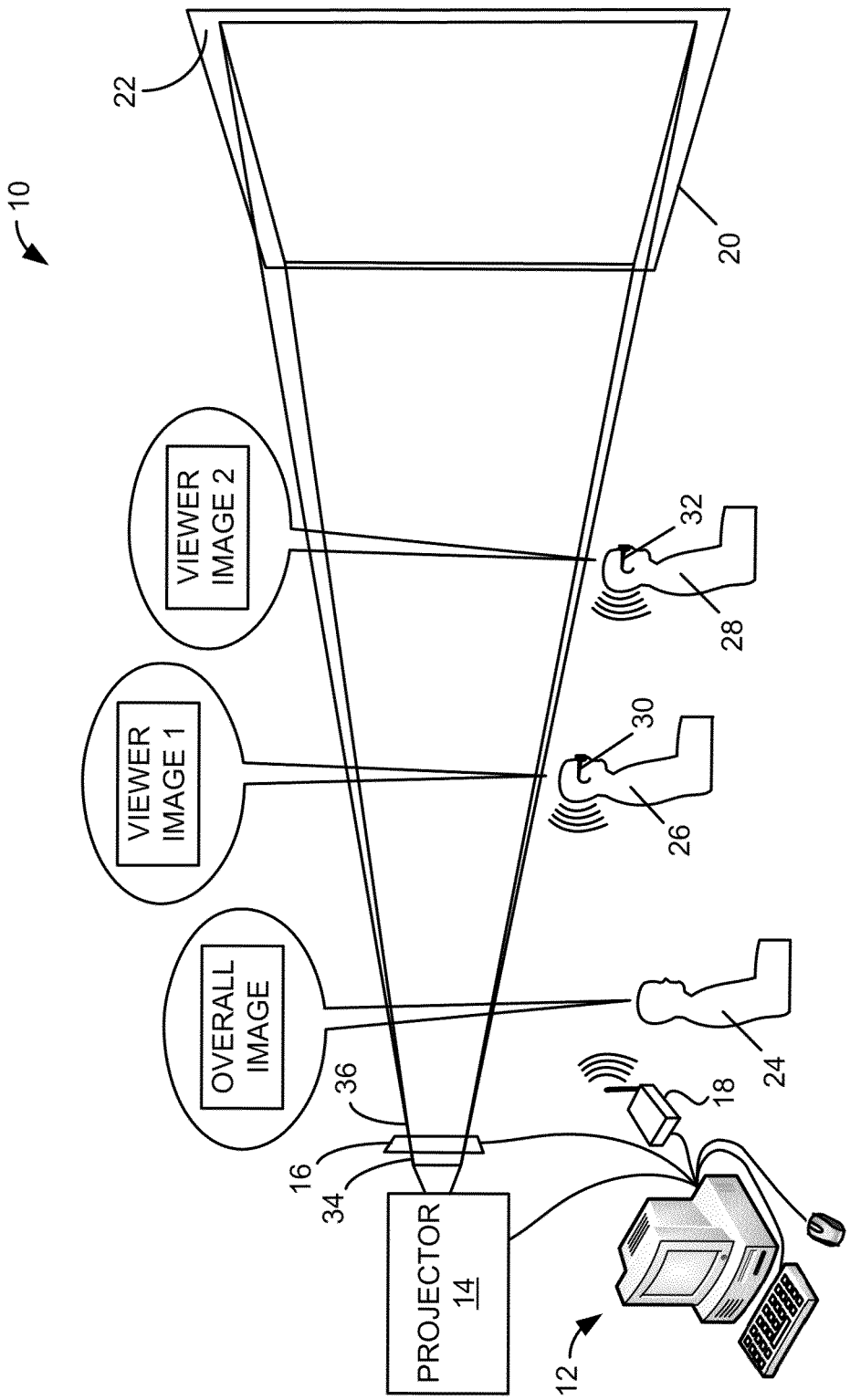
FIG. 1 illustrates one embodiment of a multi-video projection system.

While the invention is susceptible to various modifications and alternative forms, specific embodiments thereof are shown by way of example in the drawings and will herein be described in detail. It should be understood, however, that the drawings and detailed description thereto are not intended to limit the disclosure, but on the contrary, the intention is to cover all modifications, equivalents and alternatives falling within the scope of the appended claims.

DETAILED DESCRIPTION

As used herein, the term "video" refers to a visual presentation, or a visual portion of a multimedia presentation. A typical video includes a number of images intended to be presented in sequence, typically (though not necessarily) at a rate that creates an illusion of motion and continuity. The presentation may be, for example, a prerecorded presentation such as a movie or a film. Portions of movies or films may be prerecorded, and other portions may be created using, for example, computer animation. Other types of presentations, such as video games, slide shows, or interactive displays, may be created using computer animation.

Turning to the figures, FIG. 1 illustrates one embodiment of a multi-video projection system 10. In the embodiment of FIG. 1, the multi-video projection system 10 includes a computer system 12, a projector 14, an optional overlay device 16, a wireless transmitter 18, a screen 20, and two viewing devices 30 and 32. Three viewers labeled 24, 26, and 28, are simultaneously viewing images projected on a front surface 22 of the screen 20. The viewer 26 is wearing a viewing device 30 that selectively attenuates incoming light reflected from the front surface 22 of the screen 20, and the viewer 28 is wearing a similarly configured viewing device 32 that also selectively attenuates incoming light.

In the embodiment of FIG. 1, the projector 14 projects visible light 34 bearing original images or frames of a video toward the front surface 22 of the screen 20 in succession at a frame rate. The frame rate is preferably greater than or equal to the flicker fusion frequency at which the illusion of motion and continuity is created (e.g., greater than or equal to about 24 frames per second in a dark room). The projector 14 projects the light 34 bearing each original image for a frame interval, where the frame interval is the reciprocal of the frame rate. For example, if the frame rate is 24 frames per second, the frame interval is about 42 milliseconds.

In the embodiment of FIG. 1, the light 34 produced by the projector 14 bears a different one of the original images during each frame interval. As described in detail below, the overlay device 16 is positioned in front of the projector 14 such that the overlay device 16 is in a path of the light the light 34 produced by the projector 14. As the light 34 strikes the overlay device 16, the overlay device 16 alters the light 34 to form visible light 36 bearing a sequence of subimages during each frame interval. In the embodiment of FIG. 1, the overlay device 16 attenuates, on a pixel-by-pixel basis, the original images carried by incident light 34 to form the sequence of subimages carried by transmitted light 36. When the light 36 strikes the front surface 22 of the screen 20, the subimages are formed on the front surface 22. The front surface 22 of the screen 20 is preferably adapted to reflect a substantial amount of the incident light 36. The front surface 22 may be, for example, a white surface with small glass beads (e.g., for high brilliance under dark conditions), or an aluminized surface (e.g., for high contrast in moderate ambient light).

The subimages reflected by screen 20 within a frame interval combine to form an overall image that approximates the original image produced by projector 14 during that frame interval, enabling a viewer 24 to perceive the original video without requiring a viewing device. Those viewers 26, 28 using viewing devices perceive a modified version of the video. Each of the viewing devices 30 and 32 selectively attenuates the sequence of subimages during each frame interval, in effect applying a different weight coefficient to each subimage to form a weighted sum of subimages for each frame interval. The different viewing devices 30 and 32 apply different sets of weight coefficients. As a result, the viewer 26 wearing the viewing device 30 sees a "VIEWER IMAGE 1," and the viewer 28 wearing the viewing device 32 sees a different "VIEWER IMAGE 2." For example, the VIEWER IMAGE 1 may substantially be the original image with superimposed subtitles in one language, and the VIEWER IMAGE 2 may substantially be the original image with superimposed subtitles in another language.

The weight coefficients vary between 0 and 1 with at least one intermediate value, and preferably more than 50 intermediate values. The viewing devices can take the form of eyeglass frames with the lens region(s) covered by LCD panels or other elements having electronically-controlled light transmissivity (sometimes called LCD shutter glasses). Maximum attenuation (weight coefficient 0) is provided by setting the optical elements to maximum opacity, while minimum attenuation (weight coefficient 1) is provided by setting the optical elements to maximum transmissivity. Intermediate attenuation values can be provided by varying the time that the optical elements spend in each of the foregoing states, e.g., by varying the duty cycle of a square wave that drives the optical element, or varying the DC offset of a sinusoidal drive signal. Alternatively, the optical elements themselves can be set in states that provide intermediate attenuation, e.g., by varying an aperture opening size, a polarization degree, a percentage of opaque area, a coating thickness, etc. When embodied as eyeglasses, the optical elements preferably work in unison, attenuating the incoming light to both eyes of the viewer dependent on the given weight coefficients. Other forms for the viewing devices include hand-held or mounted viewing frames through which the screen 20 can be viewed.

Note that the weight coefficients are expected to vary from one frame interval to the next. Computer 12 is preferably configured to make the appropriate weight coefficients for each frame interval available via a wireless broadcast, e.g., by a wireless transmitter 18. Such wireless broadcast can take the form of an infrared signal or electromagnetic signal, though other forms may also be suitable. The viewing devices 30 and 32 are preferably configured to receive at least those weight coefficients for that video version desired by the viewer and apply them to the respective subimages. It is expected that the wireless broadcast will also include a synchronization signal to ensure that the viewing devices apply the weight coefficients in synchronized fashion to the correct subimages.

Within each frame interval, multiple sets of weight coefficients are available corresponding to the multiple viewer images that can be seen. Some embodiments of the viewing devices include a switch or other type of selector that can change the set of coefficients being applied by the viewing device, thereby switching the viewer image that is perceived.

As indicated in FIG. 1, the overlay device 16 is positioned between the projector 14 and the screen 20, and is preferably positioned adjacent the projector 14. The overlay device 16 is coupled to, and controlled by, the computer system 12. The overlay device 16 may be, for example, a two dimensional array or grid of regions having variable transmissibility (or opacity) to visible light. During operation of the multi-video projection system 10, the overlay device 16 selectively attenuates some of the light 34 produced by the projector 14 such that a number of subimages are formed on the front surface of the screen 20 during each frame interval. A pattern formed on the overlay device 16 that selectively attenuates a portion of the light produced by the projector 14, and used to create a corresponding subimage, is called an overlay mask, or simply a mask. The use of the overlay device 16 permits the system to function with an unmodified projector, enabling existing theaters and video display systems to be easily retrofitted. The projector brightness may need to be increased to compensate for the attenuation provided by overlay 16 and the viewing devices 30 and 32.

The overlay device 16 may be or include, for example, a grid of liquid crystal display (LCD) elements. A typical LCD device includes a liquid crystal disposed between layers of glass or plastic. For example, electrical conductors that are substantially transparent to visible light may be formed on opposed surfaces of the layers of glass or plastic, and may define the regions of the overlay device 16. Each region may be, for example, substantially transparent to visible light when no electrical field is applied between the electrical conductors, allowing visible light to pass through the region with minimal attenuation. Each region may also be substantially opaque to visible light when an electrical field is applied between the electrical conductors, preventing visible light from passing through the region.

Multiple subimages are formed on screen 20 during each frame interval. During a first portion of the frame interval, a first mask is formed on the overlay device 16 that selectively attenuates a portion of the light 34 produced by the projector 14, thereby forming the light 36 that bears a first subimage. When the light 36 bearing the first subimage reaches the screen 20, the first subimage is formed. During a second portion of the frame interval, a second mask is formed on the overlay device 16 that selectively attenuates a portion of the light 34 produced by the projector 14, thereby forming the light 36 that bears a second subimage, and so on. In some embodiments, the portions of the frame interval during which the different subimages are formed are equal.

In the embodiment of FIG. 1, the computer system 12 receives and/or stores the video, along with mask information for each original image in a video and corresponding weight coefficients to be broadcast to the viewing devices 30 and 32. The computer system 12 is preferably adapted to receive a removable medium (e.g., a disk or other memory device) that includes the video, mask information and the corresponding weight coefficients. In some embodiments, the weight coefficients have values between 0 (or 0.0) and 1 (or 1.0), inclusive. Computer system 12 supplies the original images to the projector 14. In synchronization with the projection of the original images (but at a higher rate), the computer system 12 provides mask information to the overlay device 16, and the overlay device 16 uses the mask information to produce the subimages. Computer system 12 further broadcasts a wireless signal to communicate weight coefficients to the viewing devices and synchronize their operation to the projection of the subimages. In one implementation, wireless transmitter 18 takes the form of a Wi-Fi base station.

As described in more detail below, the original images and a number of target images are used to form the subimages. Each target image is an ideal image to be seen by one or more viewers. The viewing devices provide weighted combinations of the subimages to form viewer images, which closely approximate the target images. VIEWER IMAGE 1 corresponds to the first target image discussed later herein, while VIEWER IMAGE 2 similarly corresponds to the second target image.

In some system embodiments, the overlay device 16 is omitted. A high-frame rate projector is employed to directly project the subimages on screen 20. One suitable projector is the ViewSonic model PJD6221, a digital light processing (DLP) projector with a 120 Hz frame rate. In such system embodiments, the computer system 12 includes a storage medium that contains, for each frame interval, the multiple subimages and the respective weight coefficients needed to produce the multiple viewer images.

Figure 2:
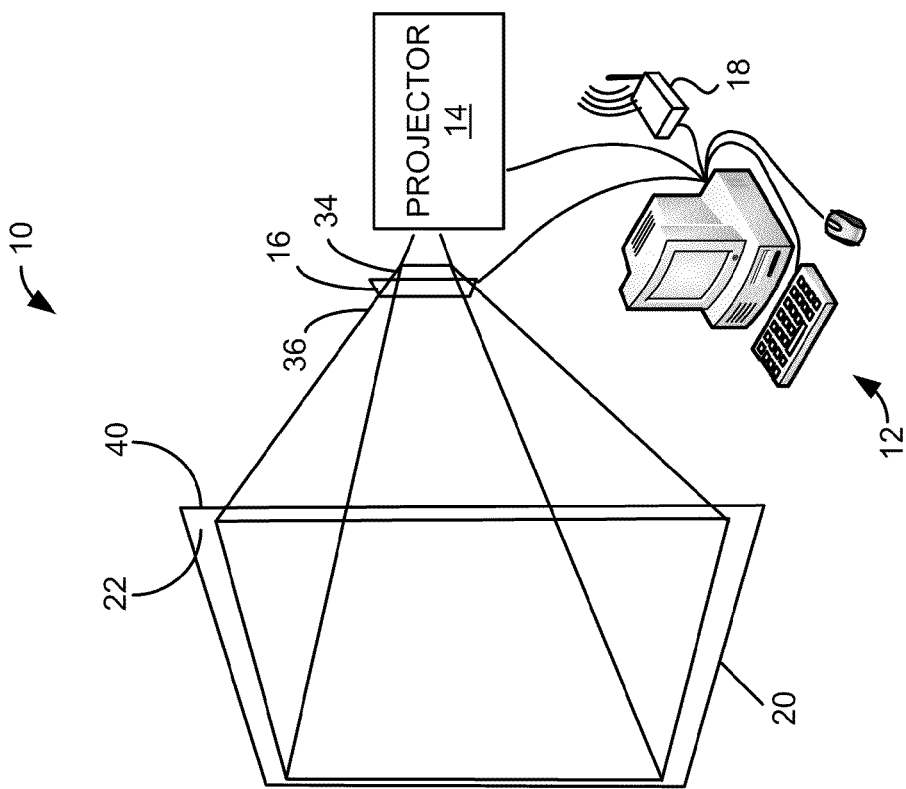
FIG. 2 illustrates another embodiment of the multi-video projection system of FIG. 1.
Figure 2:
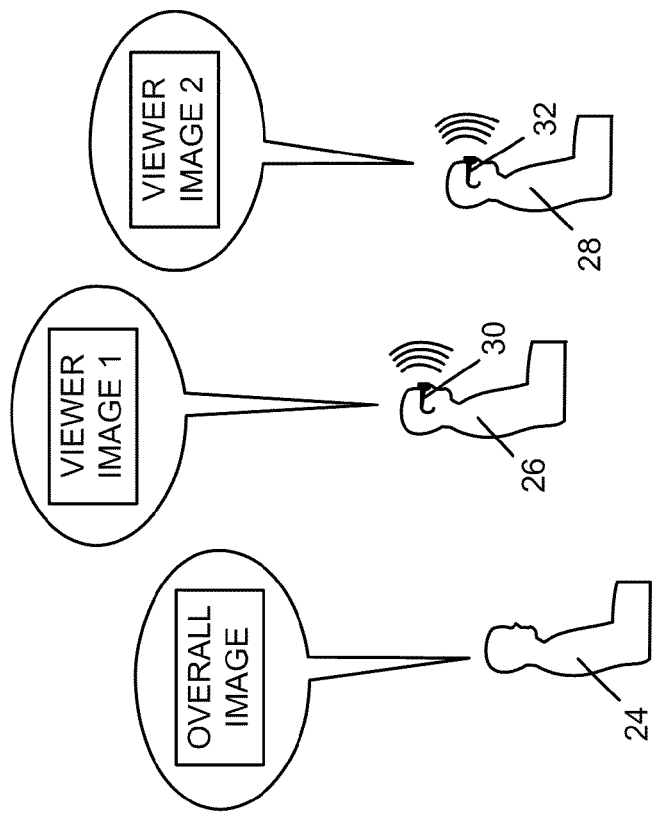

FIG. 2 illustrates another embodiment of the multi-video projection system 10 of FIG. 1. Components of the multi-video projection system 10 are labeled similarly in FIGS. 1 and 2. In the embodiment of FIG. 2, the projector 14 projects the light 34 bearing the original images of the video toward a rear surface 40 of the screen 20 in succession at the frame rate. The overlay device 16 is positioned between the projector 14 and the rear surface 40 of the screen 20, and alters the original images to form the light 36 bearing the multiple subimages. In the embodiment of FIG. 2, the screen 20 is translucent, and a portion of the light 36 exiting the front surface 22 of the screen 20 forms the subimages during each frame interval. The front surface 22 preferably has a matte finish to scatter incident light.

As with the embodiment of FIG. 1, the overlay device 16 can be omitted and the projector adapted to directly project subimages at some multiple of the original video frame rate. In other embodiments of the multi-video projection system 10, the projector 14, the overlay device 16, and the screen 20 may be replaced by a display device including a display screen, such as a monitor. The computer system 12 may receive and/or store, for each original frame interval, the multiple subimages and the respective weight coefficients needed to produce the target images (e.g., corresponding to the VIEWER IMAGE 1 and the VIEWER IMAGE 2). The computer system 12 may control the display device having a high display frame rate such that the multiple subimages are displayed during the corresponding original video frame intervals. In such embodiments, the display device directly produces the subimages on the display screen.

Figure 3:
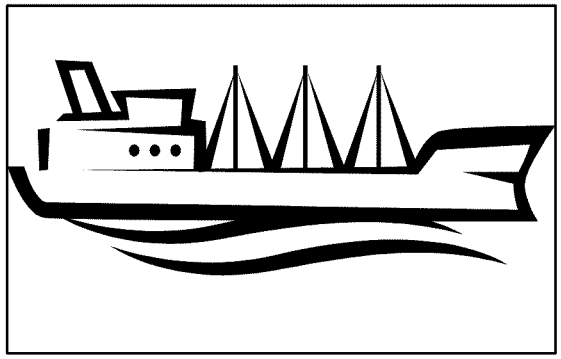
FIG. 3 shows an illustrative original image of a video.
Figure 4:
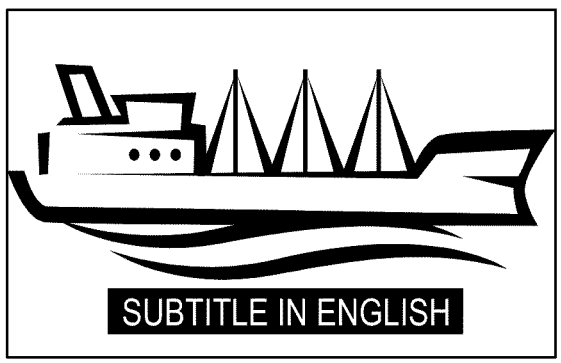
FIG. 4 shows a first target image for the video.
Figure 5:
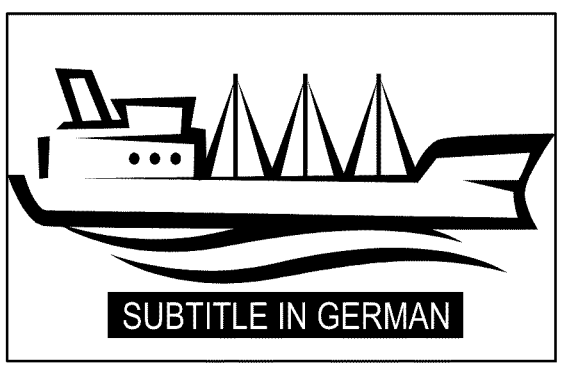
FIG. 5 shows a second target image for the video.

The subimages projected in each frame interval are derived from the original image of a video and a number of target images. FIG. 3 shows an illustrative original image of a video, which in this case includes an image of a ship. Such an original image is commonly referred to as a frame of the video, and it represents the image that should be perceived by a viewer watching the video without any viewing device. FIG. 4 shows a first target image, which in this case is the original image modified to include a subtitle in English. The first target image is labeled "TARGET IMAGE 1", and it represents the image that should be perceived by a viewers using a first category of viewing devices, e.g., LCD shutter glasses for the hearing impaired. FIG. 5 shows a second target image, which in this case is the original image modified to include a subtitle in German. The second target image is labeled "TARGET IMAGE 2", and it represents the image that should be perceived by viewers using a second category of viewing devices, e.g., LCD shutter glasses for German tourists. As described in more detail below, the ORIGINAL IMAGE, TARGET IMAGE 1 and TARGET IMAGE 2 are used to generate multiple subimages and the corresponding weight coefficients that create a first viewer image corresponding to the TARGET IMAGE 1, and a second viewer image corresponding to the TARGET IMAGE 2, while providing an overall image that corresponds to the ORIGINAL IMAGE.

Figure 6:
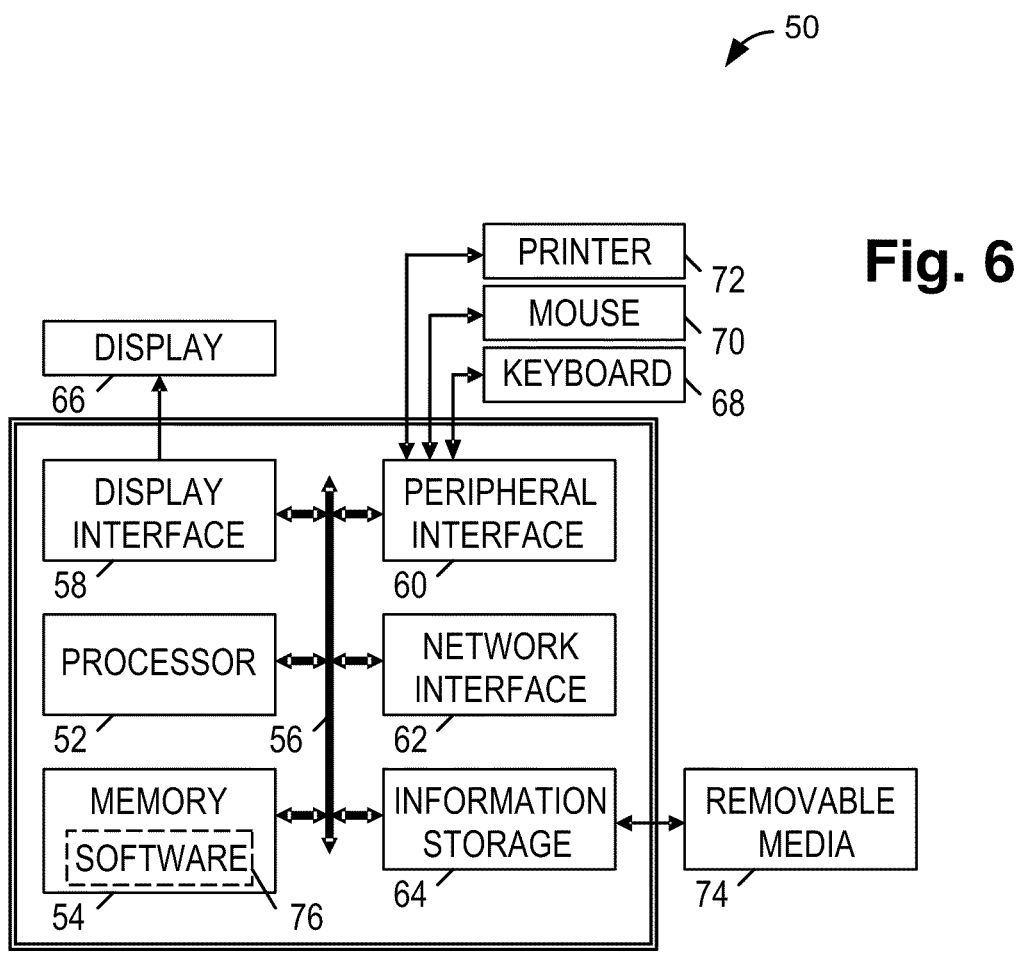
FIG. 6 is a diagram of an illustrative movie customization system.

FIG. 6 is a diagram of an illustrative movie customization system 50. In the embodiment of FIG. 6, the system 50 includes at least one processor 52 and a memory 54 coupled to a bus 56. Also coupled to the bus 56 are a display interface 58, a peripheral interface 60, a network interface 62, and an information storage unit 64. The bus 56 supports communication between the processor(s) 52, the memory 54, the display interface 58, the peripheral interface 60, the network interface 62, and the information storage unit 64, enabling the processor(s) to interact with each element of the system.

The display interface 58 is coupled to a display device 66 (e.g., a monitor). The peripheral interface 60 is coupled to a keyboard 68, a mouse 70, and a printer 72. The network interface 62 is adapted for coupling to a network (e.g., a local area network or a wide area network). The network preferably includes the Internet. These elements enable the processor(s) to interact with the world outside of system 50, e.g., to receiver user input, provide user feedback, and to access software and remotely-stored data.

The information storage unit 64 may be adapted for coupling to a removable media device 74. The removable media device 74 is, or includes, a memory device or other form of nonvolatile information storage. The removable media device 74 may be or include, for example, an optical disk such as a digital video disk (DVD), a magnetic disk such as a hard drive, a universal serial bus (USB) drive, a secure digital (SD) card, a CompactFlash card, or a SmartMedia card. The information storage unit 74 preferably has one or more ports for receiving one or more memory devices and communicating with the memory devices.

As indicated in FIG. 6, the memory 54 stores movie customization software 76. The processor(s) 52 fetch instructions of the movie customization software 76 from memory 54, and execute the instructions. In at least some embodiments, the movie customization software 76 causes the processor 52 to process each of the multiple original images of a video to produce a corresponding set of subimages and weight coefficients, where the subimages average to approximate the original video image, and the subimages combine together to form any one of multiple desired video images (i.e., target images or viewer images) when attenuated according to a corresponding set of weight coefficients. The subimages are preferably optimized to maximize the transparency of viewing devices (e.g., the viewing devices 30 and 32) subject to accuracy constraints regarding the original images and the desired video images. The movie customization software 76 also causes the processor 52 to store on the removable medium 74 information representing the subimages and the weight coefficients. (Alternatively, the output information can be communicated over the network to a desired destination or storage device.)

Figure 7A:
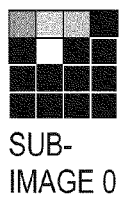
FIG. 7a shows an illustrative method in which an original image and two target images are used to produce an overall image and two viewer images.
Figure 7A:
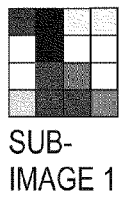
Figure 7A:
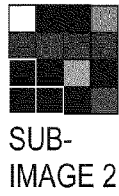
Figure 7A:
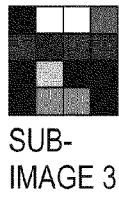
Figure 7A:
Figure 7A:
Figure 7A:

FIG. 7a is a diagram to provide an illustrative example of a method in which an original image and two target images are used to produce an overall image and two viewer images. The method of FIG. 7a may, for example, be embodied in the movie customization software 76 of the movie customization system 50 of FIG. 6. In FIG. 7a, an original image is labeled "ORIGINAL IMAGE", a first of the two target images is labeled "TARGET IMAGE 1", and the other target image is labeled "TARGET IMAGE 2". The overall image is labeled "OVERALL IMAGE", a first of the two viewer images is labeled "VIEWER 1 IMAGE", and the other viewer image is labeled "VIEWER 2 IMAGE". In this example, the original image, the two target images, the overall image, and the two viewer images are all grayscale images composed of 16 pixels arranged as 4×4 arrays. Adjacent to each image is an intensity matrix showing the intensities of the image pixels, where the pixel intensities range from 0.0 (black) to 1.0 (white).

In the method of FIG. 7a, the subimages and the weight coefficients are computed that satisfy the matrix equation $$I_a = SWI_S, \quad (1)$$

where $I_S$ is a subimage matrix in which each row represents one of multiple subimages (i.e., the pixel intensities of a subimage arranged into a row vector), W is a weight matrix having rows corresponding to ways in which the subimages are combined to form apparent images, S is a diagonal matrix of scale factors that specify the relative brightness of each apparent image, and $I_a$ is an apparent image matrix in which each row represents one of the apparent images (again, the pixel intensities arranged as a row vector). Assuming the top row in $I_a$ represents the overall image, for this example the top row could be:

[0.90, 0.90, 0.90, 0.90, 0.70, 0.70, 0.70, 0.70, 0.50, 0.50, 0.50, 0.50, 0.35, 0.35, 0.35, 0.35], assuming the use of row-major ordering, but other arrangements of the pixels could also be used. The weight matrix W includes weight coefficients ranging between 0.0 and 1.0, inclusive. In the example of FIG. 7a, the weight matrix is $$W = \begin{bmatrix} 1.00 & 1.00 & 1.00 & 1.00 \\ 0.07 & 0.47 & 0.35 & 0.00 \\ 0.01 & 0.43 & 0.00 & 0.54 \end{bmatrix}, \quad (2)$$

The number of subimages used to construct the overall image and the viewer images should be greater than or equal to the number of desired video images (i.e., target images plus any desired overall image). In this example, there are two target images and a desired overall image, indicating that at least three subimages are needed. This example uses four subimages, which provides increased flexibility in finding an optimal solution. In FIG. 7a, the subimages are labeled "SUBIMAGE 0," "SUBIMAGE 1," "SUBIMAGE 2," and "SUBIMAGE 3." The subimages are all grayscale images composed of 16 pixels arranged as 4×4 arrays. Adjacent intensity matrices show the intensities of the pixels, where the pixel intensities range from 0.0 (black) to 1.0 (white).

In the method of FIG. 7a, a diagonal scale factor matrix S specifies the relative brightness of each apparent image. The scale factors can range anywhere between 1/n and 1, where n is the number of subimages. The larger the scale factor, the brighter the apparent image. It is believed that maximum solution flexibility is provided by setting the scale factor for the overall image to 2/n and setting the scale factor for each of the viewer images to 1.0. These values should be kept constant for the entire video. Since there are three apparent images in this example (the overall image and the two viewer images), the scale factor matrix S is a square 3×3 matrix. The scale factor matrix S selected here is:

$$S = \begin{bmatrix} 0.5 & 0 & 0 \\ 0 & 1.0 & 0 \\ 0 & 0 & 1.0 \end{bmatrix} \quad (3)$$

In the method of FIG. 7a, the original image represents one frame interval, during which four subimages are projected. An initial image matrix $I_O$ is constructed using row vectors to represent the original image and each of the target images. A non-negative matrix factorization process is applied to equation (1) to determine the subimage matrix $I_S$ and the corresponding weight matrix W that provide the apparent image matrix $I_a$ that best approximates the initial image matrix. Many non-negative matrix factorization algorithms exist and the solutions are generally non-unique. Non-negative matrix factorization includes a constraint that all elements of the produced factors must be equal to or greater than zero. In other words, all elements of the produced subimage matrix '$I_S$' and weight matrix 'W' must be equal to or greater than zero. See, for example, "Algorithms and Applications for Approximate Nonnegative Matrix Factorization" by Michael W. Berry et al. Computational Statistics & Data Analysis, Vol. 52, No. 1, September 2007, pp. 155-173. Additional solution constraints can be introduced to keep the elements of the subimage and weight matrices between 0.0 and 1.0 (inclusive), and to maximize the magnitude of each of the weight matrix rows.

The values of the weight matrix W are shown in FIG. 7a as "$W_{XY}$=<weight coefficient>," where 'X' is the row number, 'Y' is the column number, and the weight coefficients range from 0 to 1. In the example of FIG. 7a, the first row (i.e., row 0) of the weight matrix W is all 1s, and is used to represent the overall image. This represents the fact that a viewer not wearing a viewing device sees a combination of all the subimages as the overall image projected on a screen. In FIG. 7a, it is noted that the overall images approximates the original image, but is not a perfect reproduction of the original image. Similarly, the first viewer image VIEWER 1 IMAGE approximates the first target image TARGET IMAGE 1, and the second viewer image VIEWER 2 IMAGE approximates the second target image TARGET IMAGE 2, but neither is a perfect reproduction of the corresponding target image. The non-negative matrix factorization process attempts to compute the pixel intensity matrices $I_S$ and the corresponding weight matrix W such that the above errors are minimized.

Figure 7B:
FIG. 7b shows an illustrative method in which three target images are used to produce three viewer images.
Figure 7B:
Figure 7B:

FIG. 7b shows a second example similar in most respects to that of FIG. 7a. However, unlike the previous example, here it is assumed the all participants are employing viewing devices. Thus, there is no overall image to constrain the solution process. In this example, the original image is replaced with a "Target Image 0", the overall image is replaced with a "Viewer 0 Image", and the scale factor matrix is taken to be an identity matrix. Of particular note for this example is the fact that the viewing devices are significantly more transparent than they would be if they simply opened for the length of a single subimage display interval and remained opaque the rest of each original frame interval.

One point that may be worthy of further discussion is the fact that the scale factor matrix is employed for mathematical convenience. The physical projection system lacks anything that corresponds to this matrix, which may lead the reader to attempt image intensity calculations without the scale factors and to question the meaning of those calculated intensity values that exceed one, the maximum intensity provided by the display system. The authors address response is two-fold. First, the subimages are each displayed for an interval that is 1/n as long as the original frame interval, meaning that the calculated intensity values for each original frame interval should be scaled by 1/n. Secondly, though perceived images may have different brightness (e.g., the overall image intensity range may be twice that of the viewer images), the human visual system will adapt to the overall brightness levels, e.g., by adjusting the viewer's pupil size, and the viewer is unlikely to be aware of differences in brightness beyond a transition period as he dons or doffs the viewing device.

Experience suggests that the largest errors produced by the factorization process occur in those areas where the original image has low pixel intensities and the target image has high pixel intensities. In some embodiments where extremely high fidelity requirements are imposed, the image customization software adjusts the target images to minimize such errors. For example, subtitles can often be shifted to different locations on the image or can be slightly advanced or delayed relative to the soundtrack. The image customization system may perform such location or timing adjustments to make the subtitles appear in areas where the original image has high pixel intensities.

The foregoing example was carried out using grayscale images. In other embodiments, the apparent images and the subimages are color images. In these embodiments, the subimage matrix and apparent image matrix have elements representing pixel color intensities (e.g., red, green, and blue pixel intensities).

FIG. 8 is a diagram illustrating how an original image can be combined with four overlay masks to generate four subimages. As described above, an overlay mask, or simply a mask, is a pattern formed on an overlay device (e.g., the overlay device 16 of FIGS. 1 and 2) that selectively attenuates a portion of light produced by a projector and bearing an original image, thereby forming a subimage.

The original image is labeled "ORIGINAL IMAGE," and the four subimages are labeled "SUBIMAGE 0," "SUBIMAGE 1," "SUBIMAGE 2," and "SUBIMAGE 3." The four masks are labeled "MASK 0," "MASK 1," "MASK 2," and "MASK 3." In FIG. 8, the original image and the four subimages are all grayscale images composed of 16 pixels arranged as 4×4 arrays. Adjacent intensity matrices show the intensities of the pixels, where the pixel intensities range from 0.0 (black) to 1.0 (white). For the masks, the pixel intensities represent opacity, ranging from 0.0 (opaque) to 1.0 (transparent). Studying FIG. 8, it becomes evident that combing the opacities of MASK 0 with the intensities of corresponding pixels in the original image forms, or approximates, the SUBIMAGE 0. Similarly, combing the pixel opacity MASK 1 with the intensities of corresponding pixels in the original image forms, or approximates, the SUBIMAGE 1, and so on. Once a subimage intensity matrix been computed, it is possible to use the pixel intensity values in the subimage intensity matrix, and the intensity values of corresponding pixels in the original image intensity matrix, to compute required pixel intensity values in a corresponding mask intensity matrix. Alternatively, equation (1) can be rewritten to account for the operation of the masks on the original image, and a non-negative matrix factorization process may be implemented to compute the mask intensity matrices directly. This process may be embodied in the movie customization software 76 of the movie customization system 50 of FIG. 6.

Figure 9:
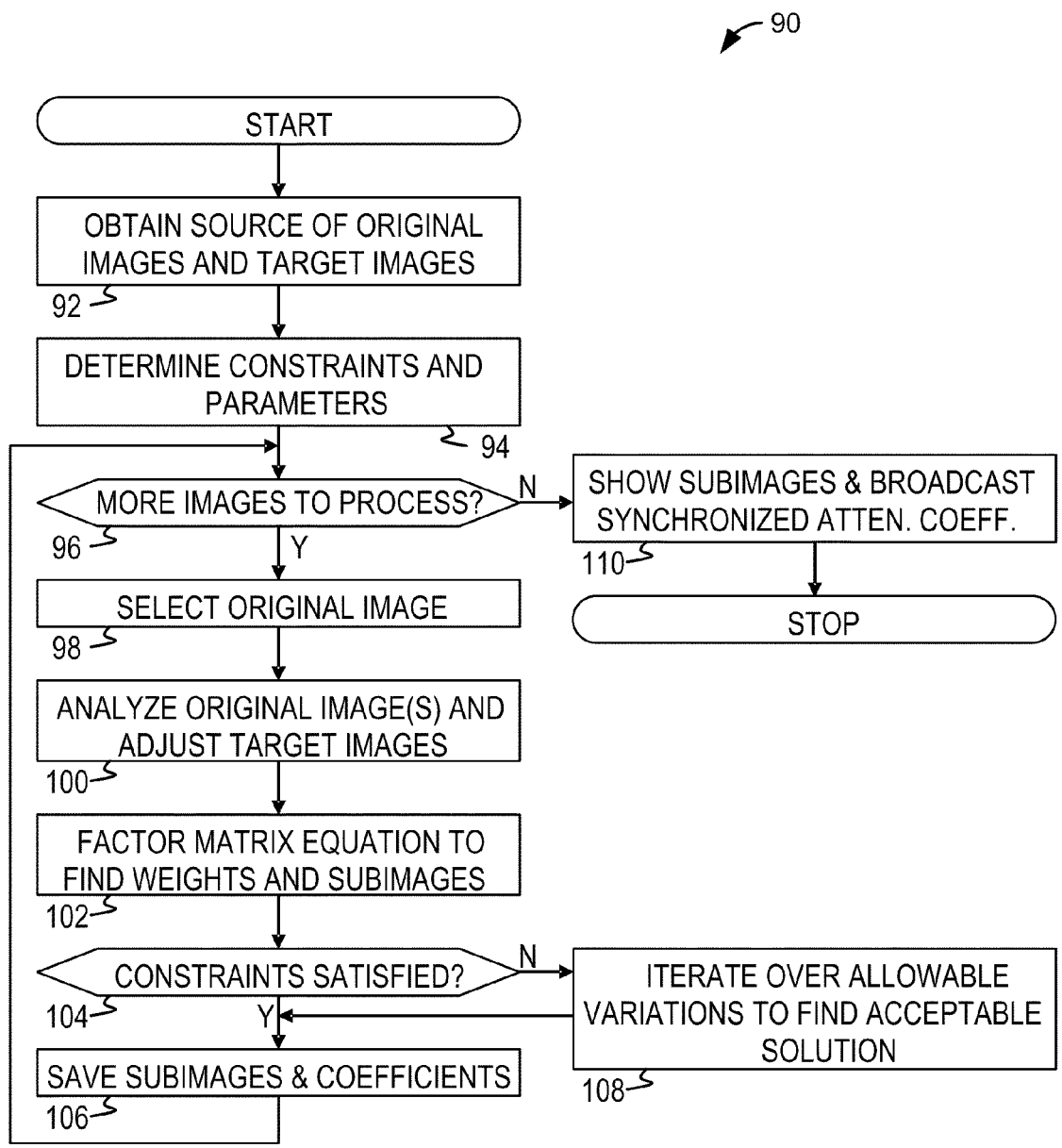
FIG. 9 is a flowchart of an illustrative multi-video display method.

FIG. 9 is a flowchart of an illustrative multi-video customization and display method 90. During a first step 92 of the method 90, customization system 50 obtains a source of original images and target images. For example, the original images may be taken from an original video presentation, and the target images may be subtitled images derived from information associated with the original video presentation. Alternatively, the original image and target images may be dynamically-generated video content, e.g., from an interactive multiplayer gaming system. In block 94, customization system 50 determines the multi-video customization parameters and constraints. Such parameters and constraints may include the number of subimages per original image, scale factor matrix S, the fidelity requirements to the original and target images, the optimization goals (e.g., viewing device transparency, subimage variance, weight coefficient variance, overlay mask transparency, etc.), computation time limits, and limits on target image adjustments.

Blocks 96-108 represent a loop that the customization system 50 repeats for each original image in the video stream. In block 96, the system determines whether or not there are more original images to process. If not, the processing is complete and in block 110 the stored subimages are provided for display to be accompanied by wireless broadcasting of the weight coefficients as described previously, and the method terminates. Otherwise, in block 98 the system selects the next original image to be processed. In optional block 100, the system analyzes the original image and creates or adjusts the target images, e.g., by placing subtitles in regions of the original image where pixel intensities are high. In block 102, the system constructs an initial image matrix from the original and target images and applies a non-negative matrix factorization method to determine a subimage matrix and a weight matrix. In block 104, the system determines whether the constraints are satisfied, e.g., whether the subimage and weight matrix elements are in the range between 0-1, whether the apparent image matrix is sufficiently true to the initial image matrix, and whether minimal optimality levels have been reached (e.g., sufficient transparency for each of the viewing devices). If not, then in block 108, the system iterates through a set of variations to find an "acceptable" solution. Such variations may include adjusting the target image to shift, re-size, or omit the subtitles, adjusting the original image to brighten the darkest parts of the image or to insert a subtitle, relaxing fidelity requirements for the target images and, if necessary, for the original image, etc. The system designers may also identify other allowable variations. Once the constraints are satisfied or an otherwise acceptable solution is found, the subimages and weight coefficients are saved in block 106, and the system returns to block 96.

As described above, an original image of a video constitutes a frame of the video. Each frame of a video is intended to be displayed for a frame interval. In block 100, multiple subimages are displayed during every frame interval, where the multiple subimages may average to substantially equal the original image (i.e., the frame). The weight coefficients (i.e., attenuation coefficients) corresponding to the subimages are wirelessly transmitted for use by the viewing devices in each frame interval. The weight coefficients, when applied to the subimages, enable users of viewing devices to perceive customized images during each frame interval. The weight coefficients typically vary between frame intervals.

Numerous variations and modifications will become apparent to those skilled in the art once the above disclosure is fully appreciated. For example, it is not a requirement that the overall image represent anything meaningful. In system and method embodiments intended for use in environments where every viewer has a viewing device (e.g., shared-station multiplayer video games), the apparent image matrix $I_a$ can omit the row representing the overall image and the weight matrix W can omit its row of all 1's when the matrix factorization process is performed. The disclosed systems and methods can also be adapted to provide 3D viewing by independent controlling the images seen by each eye of the viewers, e.g., with the use of eyeglass frames having independently driven LCD shutters. Each shutter applies the weight coefficients that synthesize the image for the left or right eye, respectively.

In another variation, the wireless communication channel can be replaced with a wired communication channel, thereby offering a potentially inexpensive, rugged system for use in small group environments. It is intended that the following claims be interpreted to embrace all such applicable variations and modifications.

What is claimed is:

1. A projection system that comprises:
   a display that renders a video representing a sequence of original images each having a corresponding frame interval, the rendering performed by displaying a plurality of subimages in each frame interval that average to approximate the original image corresponding to that frame interval; and
   at least one viewing device that attenuates each said subimage by a respective coefficient to synthesize a target image for each frame interval for a user of said viewing device, at least one of said respective coefficients being in a range between zero and one to optimize, subject to customization constraints, at least one optimization goal in the set consisting of: viewing device transparency, subimage variance, weight coefficient variance, overlay mask transparency, and any weighted combination thereof,
   wherein the plurality of subimages, coefficients, original and target images for a given frame interval satisfy a matrix equation Ia=SWIs, with Ia being a matrix having rows that represent the original and target images, S being a diagonal matrix of scale factors that specify a relative brightness of the original and target images, W being a matrix having said coefficients as elements, and Is being a matrix having rows that represent the plurality of subimages.

2. The system of claim 1, further comprising at least one additional viewing device that applies attenuation coefficients to the subimages to synthesize a second, different target image for each frame interval for a user of said additional viewing device.

3. The system of claim 1, further comprising a wired or wireless communication system that communicates attenuation coefficients for each target image.

4. The system of claim 3, wherein the attenuation coefficients vary from one frame interval to the next.

5. The system of claim 4, further comprising a storage medium having, for each frame interval, the plurality of subimages and the respective coefficients to produce multiple target images.

6. The system of claim 4, further comprising a storage medium having, for each frame interval, the corresponding original image, a plurality of overlay masks to convert the original image into said subimages, and the respective coefficients to produce multiple target images.

7. A projection method that comprises:
   displaying in each of multiple frame intervals a plurality of subimages that average to form an overall image for that frame interval;
   transmitting, to a viewing device, attenuation coefficients in a range between zero and one (including attenuation coefficients with intermediate values to optimize, subject to customization constraints, at least one optimization goal in the set consisting of: viewing device transparency, subimage variance, weight coefficient variance, overlay mask transparency, and any weighted combination thereof) that, when applied to the subimages, enable a user of the viewing device to perceive a customized image for each frame interval, wherein the plurality of subimages, attenuation coefficients, and customized image for a Riven frame interval satisfy a matrix equation Ia=SWIs, with I, being a matrix having rows that represent the overall and customized images, S being a diagonal matrix of scale factors that specify a relative brightness of the overall and customized images, W being a matrix having said attenuation coefficients as elements, and Is being a matrix having rows that represent the plurality of subimages.

8. The projection method of claim 7, wherein each overall image approximates a video frame corresponding to that frame interval.

9. The projection method of claim 7, wherein each overall image is not constrained to approximate a given visual image.

10. The projection method of claim 7, wherein at least some of the attenuation coefficients have a value of zero and at least some of the attenuation coefficients have a value of one.

11. The projection method of claim 7, further comprising:
transmitting, to a second viewing device, attenuation coefficients that, when applied to the subimages, enable a user of the second viewing device to perceive a second, different customized image for each frame interval.

12. The projection method of claim 8, wherein said viewing devices are LCD shutter glasses having an opacity that varies in accordance with the attenuation coefficients.

13. The projection method of claim 7, wherein the subimage attenuation coefficients vary between frame intervals.

14. A video customization system that comprises:
at least one processor; and
a memory coupled to the at least one processor, the memory storing software that causes the at least one processor to process each of a plurality of original video images to determine a corresponding set of subimages and weight coefficients with values in a range between two extreme values, with at least some of the weight coefficients having intermediate values to optimize, subject to customization constraints, at least one optimization goal in the set consisting of: viewing device transparency, subimage variance, weight coefficient variance, overlay mask transparency, and any weighted combination thereof,
wherein the subimages average together to approximate the original video image,
wherein the subimages further combine together to form any one of a plurality of desired video images when attenuated in accordance with a corresponding set of weight coefficients, and
wherein the subimages, weight coefficients, and desired video images for a Riven original video image satisfy a matrix equation Ia=SWIs, with Ia, being a matrix having rows that represent the original and desired video images, S being a diagonal matrix of scale factors that specify a relative brightness of the original and desired video images, W being a matrix having said weight coefficients as elements, and Is being a matrix having rows that represent the set of subimages.

15. The system of claim 14, wherein the software further causes the at least one processor to store on a recording medium information representing the subimages and the weight coefficients.

16. The system of claim 14, wherein the subimages are optimized to maximize transparency of viewing devices subject to accuracy constraints regarding the original video image and the desired video images.

17. The system of claim 14, wherein the extreme values are zero and one, wherein at least some of the weight coefficients have a value of zero and at least some of the weight coefficient values have a value of one.

18. A multi-video system that comprises:
at least one processor; and
a memory coupled to the at least one processor, the memory storing software that causes the at least one processor to determine, for each of multiple frame intervals, a set of subimages and weight coefficients that satisfy the matrix equation Ia=SWIs, wherein Is is a subimage matrix in which each row represents the pixel intensities or colors of a subimage, W is a weight matrix having rows of weight coefficients specifying how the subimages are combined to form apparent images, the elements of W ranging between zero and one (including one or more elements having intermediate values to optimize, subject to customization constraints, at least one optimization goal in the set consisting of: viewing device transparency, subimage variance, weight coefficient variance, overlay mask transparency, and any weighted combination thereof), S is a diagonal matrix of scale factors that specify the relative brightness of each apparent image, and Ia is an apparent image matrix in which each row represents the pixel intensities or colors of an apparent image
wherein at least two rows of the apparent image matrix represent different images
targeted to viewing device users; and
a display coupled to the at least one processor to show the subimages.

19. The system of claim 18, further comprising a plurality of viewing devices that attenuate subimages in accordance with weight coefficients that enable a user to view one of said different images.

20. The system of claim 19, further comprising a wireless transmitter that communicates the weight coefficients from the at least one processor to the plurality of viewing devices.

21. The system of claim 18, wherein the apparent image matrix further includes a row representing an overall image for viewers not employing a viewing device.

22. The system of claim 18, wherein the software implements a non-negative matrix factorization process for each frame interval with given values for S to determine W and Is.

23. The system of claim 22, wherein the number of subimages per frame interval is greater than the number of desired video images.

* * * * *

UNITED STATES PATENT AND TRADEMARK OFFICE
CERTIFICATE OF CORRECTION

| | | |
|---|---|---|
| PATENT NO. | : 8,451,325 B2 | Page 1 of 1 |
| APPLICATION NO. | : 12/692635 | |
| DATED | : May 28, 2013 | |
| INVENTOR(S) | : Daniel A. Birnbaum et al. | |

It is certified that error appears in the above-identified patent and that said Letters Patent is hereby corrected as shown below:

In the Claims

In column 13, lines 10 and 58, the words "Riven" should be replaced with --given--.

Signed and Sealed this
Eighth Day of September, 2015

Michelle K. Lee
*Director of the United States Patent and Trademark Office*